United States Patent Office 3,314,325
Patented Apr. 18, 1967

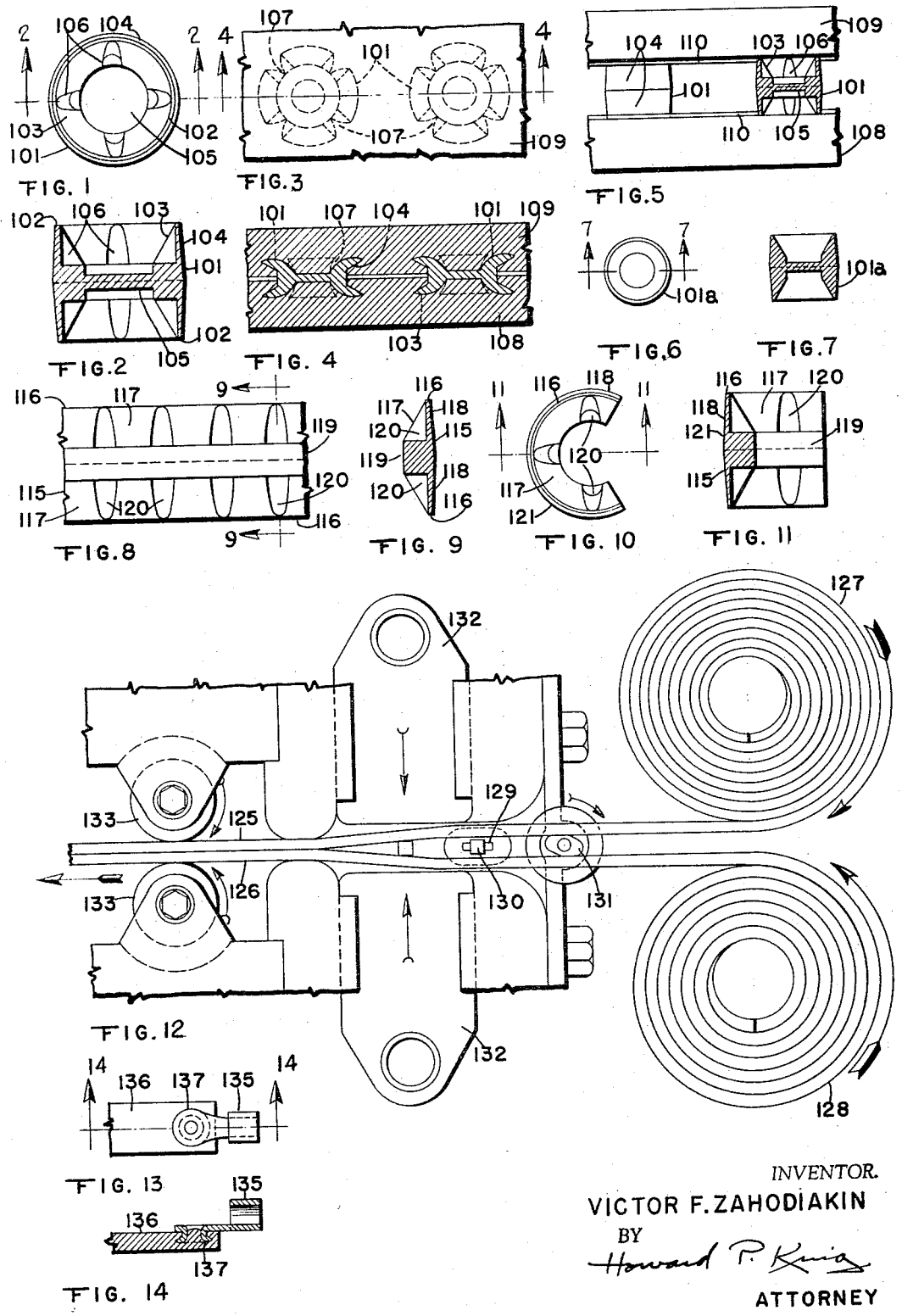

3,314,325
CONCEALED INTERNAL MECHANICAL FUSION
FOR METALLIC MEMBERS
Victor F. Zahodiakin, P.O. Box 689,
Summit, N.J. 07901
Filed May 25, 1965, Ser. No. 458,727
7 Claims. (Cl. 85—14)

This invention relates to concealed internal mechanical fusion for metallic members, and more particularly is directed to utilization of prongs embedded in a metallic member at one surface thereof without protruding at the opposite surface of said member and which, for brevity, may be designated a blind rivet.

Basically, the invention is directed to provision of a means, or blind rivet, capable of tenaciously securing two members together at juxtaposed flat surfaces of such members irrespective of the thickness of the said members.

In broad terms, the securing means comprises a prong of which various forms are contemplated, but in each instance is adapted to be deflected in part laterally within the member into which it is forcefully embedded with high velocity impact.

Furthermore, the said deflection is sought and attained to such extent that the embedded end of the prong assumes a direction transverse to its initial lengthwise direction to an extent of becoming substantially parallel to the member surface.

It is a purpose of the invention to accomplish an embedding of the prong such that the prong makes entry into the material of the member being secured, and deflection or bending delayed or caused to take place beyond the point of entry so as to locate the deflection well within the member and with material of the member entirely surrounding the prong.

More specifically, the prong in each instance is provided with two opposite faces which, lengthwise of the prongs, are at dis-similar angles, herein designated power angle and controlling angle respectively, the controlling angle being considerably less than the power angle.

The structure involved provides for meeting of said two faces of the prong to provide a cutting end edge thereat, the wall thickness of the prong progressively increasing rearwardly from the said cutting edge.

The invention provides for compressing metal under the deflected portion thereof to thereby increase strength of retention of assembly.

Other objects, advantages and structural features will appear to persons skilled in the art to which the invention appertains as the description proceeds, both by direct recitation thereof and by implication from the context.

Referring to the accompanying drawings, in which like numerals of reference indicate similar parts throughout the several views:

FIGURE 1 is a plan view of a single tubular type of double-ended blind prong with crevice-promoting scorings;

FIGURE 2 is a sectional view on line 2—2 of FIG. 1;

FIGURE 3 is a plan view of members secured by the blind prong of FIG. 2;

FIGURE 4 is a sectional view on line 4—4 of FIG. 3;

FIGURE 5 is an elevational-section showing the members and blind prongs in position ready to be compressed, and also indicating presence of film carrier strips for the said prongs by which the same may be readily positioned;

FIGURE 6 is a plan view of another form of tubular double-ended prong alone;

FIGURE 7 is a sectional view on line 7—7 of FIG. 6;

FIGURE 8 is a double-edged strip with transverse crevice-promoting scorings made by rolling a strip of steel which can be severed into desired lengths for use;

FIGURE 9 is a sectional view on line 9—9 of FIG. 8;

FIGURE 10 is a plan of a double-ended prong made from a severed length of the strip of FIG. 8 and arranged in a segment of a cylindrical configuration so as to provide an open end or side to position toward a nut hub for economy of space;

FIGURE 11 is a sectional view taken on line 11—11 of FIG. 10;

FIGURE 12 is a plan of a machine for sewing continuously fed members together as fed from rolls;

FIGURE 13 is a plan of an electrical connector secured to a metallic bus-bar in accordance with my invention;

FIGURE 14 is a longitudinal sectional on line 14—14 of FIG. 13.

In the specific embodiment of the invention illustrated in said drawings and devoting attention initially to FIGS. 1–3, an example is given of two members 108, 109 required to be clamped together for same particular purpose. For convenience in distinction between said members, the one at the bottom will be referred to as basal member 108 and the other can be known as the second member 109. Ordinarily said members are metal, of which steel and aluminum are examples capable of being punched, as will be further dealt with hereinafter. Also it may be mentioned that the members have flat surfaces two of which are adapted to be juxtaposed in flatwise engagement.

The members are provided with means for obtaining concealed internal mechanical fusion to hold them together. For this purpose, the flat member-engaging faces thereof are provided with prongs or blind rivets 101 of a character adapted to be introduced into the said members by impact force longitudinally of said prongs.

The prongs or blind rivets 101 of this embodiment are tubular or hollow and each as here shown is double-ended, with an integral web 105 transversely therebetween, the two prongs extending from the outer ends to said web. The depth of penetration into the member is determined by calculation to provide a volume capacity of the entire hollow to approximate at least the volume of material constituting the prong. Said hollow flares outwardly with a frusto-conical shape, thereby providing a face 103 angularly disposed with respect to the length of the prong. The angle of said face 103 to the prong axis is critically within the range of 25° to 40° and preferably 30° for use with common 1020 steel generally used in industry. This described angle will be referred to as the power angle and said frusto-conical face as the power face.

The outer periphery of each prong likewise has a longitudinal taper with the end next to the web having the greater diameter. The angle of this taper is likewise critically within the range of 3° to 15° and preferably 8° for the above-mentioned steel. The angle of taper will be referred to as the control angle and the tapered exterior surface as the control face 104. Due to the respective internal and external locations of the power face 103 and control face 104, the deflection of prong in the showing under discussion will be radially outward. The control face and power face, by virtue of their angularities, intersect at the lower end of the prong, and form, in this instance, a circular cutting edge for the prong. It also may be noted, that by virtue of the angularities of the two faces, the thickness of the prong wall varies progressively, increasing in thickness in approach toward the web.

Inasmuch as the prongs are to function for metal-piercing purposes during assembly of the members, it is necessary to have a considerably greater hardness for the prongs than for said members.

In making the assembly, the prong is located in position between the members 108, 109. High velocity impact pressure is then applied to the members in direction lengthwise of the prongs, injecting the prongs into the material of the members until the continuous faces of the members are in flatwise contact. In accomplishing this assembly, the prongs pierce the members, and it is during this piercing that the above-mentioned critical angles function to obtain desired radial deflection generating a rounded flare, or in this instance obtains mushrooming of the said prongs. The power angle exerts a radial force to deflect the power face, that deflecting force being in part opposed by the opposite slope of the controlling face 104. By proper choice of angles for the material used, a delayed action of bending of the prong is effected so that the prong makes a longitudinal piercing entry which is followed with a radial deflection or mushrooming of the prong within the material of the members, to the extent that a plane substantially parallel to the top and bottom surfaces of the members and between those surfaces will be tangential to the rounded flare of the prong. The radially outward margin of the rounded flare provides a transverse shoulder locking the prong in the members. Since the power surface in the showing being discussed is radially inward, the force thereon functions to expand the prong at its inwardly injected end in a mushroom formation. The members 108, 109 consequently are secured together by a concealed internal mechanical fusion accomplished by the deflected prong injected at both of its ends internally within the members. Metal of each member enters the hollow was a filling and is accommodated without injury to the prong by virtue of the capacity of the hollow. It will be observed, therefore, that the material of the prongs is thus embedded in the members 108, 109 and that material of the members is embedded in the prongs so that the prongs are entirely surrounded. The volume of material in the prong may be calculated and the hollow then made of appropriate capacity to accommodate the ascertained volume of prong material.

While it will be apparent to persons skilled in the art, that the prongs 101 of FIGS. 1–7 are products of cold heading machine manufacture, the invention is equally applicable to sheet-metal manufacture, as shown in FIGS. 8–11, where the prongs are pressed or rolled from alloy steel and provided with the above-described power and control faces.

It will now be understood that individual double-ended prongs may be employed at selectively placed intervals between two members, as shown in FIGS. 3–5. According to this showing, double-ended cylindrical prongs 101 may be provided, each end having a circular cutting edge 102. From each cutting edge, the prong provides cylindrical internally located power faces 103 and external control faces 104 the angularities, functions and advantages whereof correspond to description heretofore given. The maximum thickness of the prongs is medially of the axial length thereof, and at this medial location a web 105 diametrically located and integral with the cylindrical walls of the prong may be provided. In this particular showing, the annular power face 103 at each end of the prong may be provided with crevice-promoting scorings 106 at peripheral intervals and extending longitudinally inwardly toward said web. These scorings permit crevices 107 to develop when the prong is subjected to the injecting impact in use and thereby positively produces irregularities that will prevent rotation of the prong in the member. This feature has particular advantage when only a single prong is utilized. The double-ended cylindrical prongs are placed at desired locations with their bottom cutting edges 102 resting on one member 108 after which a second member 109 applied on the upper cutting edges of the prongs. In order to prevent the prongs from becoming dislocated during placement of the second member, a film 110 or other means may be provided to which the prongs may be adhered in their contact therewith at their cutting edges. After the upper member is placed, forceful impact will inject the prongs into the two members with the previously described radial deflection or mushrooming by virtue of each end of the prong having the aforementioned power face and control face and the applied force compressing metal of the member to fully receive the several prongs and obtain the desired concealed internal mechanical fusion of the juxtaposed metallic members.

In order to avoid any implication that the double-ended prong must of necessity have crevice-promoting scorings, I have included FIGURES 6 and 7 showing a double-ended cylindrical prong 101a having the construction and features of the above-described cylindrical double-ended prong except that it does not include scorings. The use and operation of this prong will accord with description above given.

The provision of crevice-promoting scorings is not necessarily confined to cylindrical prongs. For instance, in FIGS. 8 and 9, a straight-blade form, as distinguished from cylindrical, is shown wherein a continuous blade prong 115 is formed by rolling a strip of metal forming the opposite longitudinal sides as cutting edges 116 and inwardly from these edges shaping the thickness of the strip to provide power faces 117 and control faces 118, the middle of the strip having maximum thickness and in effect constituting a longitudinal ribbon 119. At intervals, transverse to the cutting edges and to said ribbon, but not interrupting them, are scorings 120 of the same character as described heretofore with respect to the scorings 106 for the cylindrical prong. Any length and placement in any desired configuration, may be employed, and injection of the prongs so selected and used will have the operation and advantages of the previously described forms to attain the internal concealed mechanical fusion of two members between which it is placed and into which injected.

A section of the last-above described prong construction may be bent longitudinally into segmentally cylindrical form as shown with the prong 121 of FIGURES 10 and 11, to which the same reference numerals are applied. While, in accord with other double-ended prongs, the prong may be embedded simultaneously in two opposed members, as repeatedly described above, it is to be understood that the embedding may be done successively, first in one member and thereafter in another member.

Instances occur requiring metal in one roll to be secured to other metal, perhaps also in a roll, for instance, and requirement to fabricate a laminated strip, or as another instance to secure a margin of one strip to a lapped margin of another strip. My invention provides the capability of sewing one strip to another rapidly and automatically by use of apparatus such as shown in FIGURE 12. Upper and lower strips of material 125 and 126 are fed from respective rolls 127 and 128 in lapping or overlying relation, to a machine wherein a plunger or other feeding means 129 entering from the side of the strips places a double-ended prong 130 in proper upright position between the strips. To assure that the two strips provide adequate gap therebetween for entry of the plunger and prong, a spreading cam 131 may be provided shortly in advance of the plunger position and synchronized with the plunger in its operation. The strips are fed with a step-by-step longitudinal advancement, and the plunger also has a lateral movement coordinated with and in direction of advancement of the strips, after initial introduction therebetween. As the strips and prong are advanced together, the strips converge and engage the prong therebetween so the prong is then retained in place thereby, whereupon the plunger retracts from between the strips to pick up and introduce another prong for repeating the cycle of operation. The prong that was left engaged between the converging strips is then embedded in the two strips by an impacting blow applied to the strips by opposing sliding hammers 132. All movements are synchronized; the feeding means comprising intermittently rotating rollers 133 in frictional contact with the outgoing combined strip and advancing the strips a distance equal to and simultaneously with the lateral movement of the plunger so that the plunger and prong move at the same time and distance in the strip-feeding direction. The timing is such that the hammers apply the impacting blow after the plunger retracts from between the strips, and the spreading cam functions to spread the strips before the plunger seeks to return therebetween. Each prong consequently functions as a single stitch which in the aggregate sew the strips together by a concealed internal mechanical fusion.

Commercial applications of the invention are legion, and as an example of use in the electrical art, FIGS. 13 and 14 show a wire-pinch connector 135 secured to a flat bus bar 136. A flat part of the connector is provided with a prong 137 drawn therefrom in the same manner and with the same construction and features as described above.

Finally, special attention is directed to the fact that in all forms of the invention hereinabove disclosed, the prongs all provide power angle surfaces and control angle surfaces and in each instance by correctly providing the same for a given material with which used, the result attained will be precise radial deflection of the injected end of the prong. In every instance, furthermore, the prong when used is embedded and constitutes a concealed internal mechanical fusion with respect to the members to which applied.

I claim:
1. A structure for concealed internal mechanical fusion for metallic members, comprising a prong constituted as a body of revolution about an axis providing an uninterrupted circular cutting edge in a plane perpendicular to said axis, said prong being hollow backwardly from said cutting edge and constituted with a rearwardly uniformly increasing thickness of the prong wall as straight-line conical inside and outside surfaces meeting at said cutting edge with said thickness increasing at a substantial angle and obtaining a penetration in use on a said metal member measured normal to the penetrated surface approximating the radially outward deflection of the cutting edge the angle of taper on the outside surface being substantially less than the angle of taper on the inside surface relative to the axis, and said prong having symmetrically disposed scorings at the interior surface of the prong wall extending rearwardly from said cutting edge.

2. A structure in accoradnce with claim 1, wherein said angle is constituted with provision of an internal angle to the axis of twenty-five to forty degrees.

3. A structure in accordance with claim 1, wherein said angle is constituted with provision of an external angle to the axis of three to fifteen degrees.

4. A structure in accordance with claim 1, wherein said angle is constituted with provision of an internal angle to the axis of twenty-five to forty degrees and with provision of an external angle to the axis of three to fifteen degrees.

5. A structure in accordance with claim 1, wherein the hollow interior of the prong represents a displacement approximately that of the displacement of the material of the prong.

6. A structure in accordance with claim 1, wherein the body of revolution is double-ended with each end portion in duplicate of the other thereby providing a prong at each end of said body.

7. A structure in accordance with claim 6, wherein a transverse web is provided between the hollows of the opposite prongs.

References Cited by the Examiner
UNITED STATES PATENTS

| | | | |
|---|---|---|---|
| 1,349,183 | 8/1920 | Anderson | 85—30 |
| 1,500,021 | 7/1924 | Wilson | 85—38 |
| 1,979,686 | 11/1934 | Hall et al. | 29—512 |
| 2,300,767 | 11/1942 | Beegle | 85—11 |
| 2,321,101 | 6/1943 | Openshaw | 85—14 |
| 2,486,769 | 11/1949 | Watson | 151—41.73 |
| 2,849,765 | 9/1958 | De Sena | 85—14 |
| 3,036,672 | 5/1962 | Kohl | 29—432 |

FOREIGN PATENTS

| | | |
|---|---|---|
| 931,930 | 11/1947 | France. |
| 68,764 | 1/1930 | Sweden. |
| 201,214 | 2/1939 | Switzerland. |

CARL W. TOMLIN, *Primary Examiner.*

MARION PARSONS, JR., *Examiner.*